United States Patent [19]
Kimura

[11] Patent Number: 5,969,598
[45] Date of Patent: Oct. 19, 1999

[54] ACCIDENT REPORTING SYSTEM FOR A LAND VEHICLE

[75] Inventor: Makoto Kimura, Kanagawa-ken, Japan

[73] Assignee: Nissan Motor Co., Ltd., Yokohama, Japan

[21] Appl. No.: 08/895,896

[22] Filed: Jul. 17, 1997

[30] Foreign Application Priority Data

Jul. 17, 1996 [JP] Japan ................................ P08-187708

[51] Int. Cl.$^6$ .................................................. B60Q 1/00
[52] U.S. Cl. ........................ 340/436; 280/735; 180/274; 180/282; 701/45; 340/539
[58] Field of Search ..................................... 340/435, 436, 340/539; 280/728.1, 730.1, 731, 734, 735; 180/268, 271, 274, 282; 701/45; 307/10.1; 455/564; 379/40

[56] References Cited

U.S. PATENT DOCUMENTS

| | | | |
|---|---|---|---|
| 5,229,943 | 7/1993 | Eigler et al. | 701/45 |
| 5,339,242 | 8/1994 | Reid et al. | 701/45 |
| 5,508,920 | 4/1996 | Gioutsos et al. | 701/45 |
| 5,555,286 | 9/1996 | Tendler | 379/40 |
| 5,718,451 | 2/1998 | White | 280/735 |

*Primary Examiner*—Daniel J. Wu
*Assistant Examiner*—Julie B Lieu
*Attorney, Agent, or Firm*—Foley & Lardner

[57] ABSTRACT

In the present accident reporting system for a land vehicle, when an emergency such as a crash-accident occurs and a sudden deceleration is exerted to a body, an calculating section time-integrates the acceleration detected by an acceleration sensor, and outputs an instruction to unfold an air bag when the integrated value exceeds a specified value, and unfolds an air bag. In parallel with the unfolding of an air bag, an emergency level determining section judges at least a slight accident occurs if an instruction to unfold an air bag is outputted, and after that, monitors the integrated value of acceleration of the calculating section, and judges a multiple impact accident occurs when the integrated value of acceleration after the unfolding of an air bag exceeds a specified value. An emergency communication operating section automatically sends an emergency information corresponding to the result of the judgment of the emergency level determining section concerning slight-accident/serious-accident to an emergency center with radio wave.

6 Claims, 4 Drawing Sheets

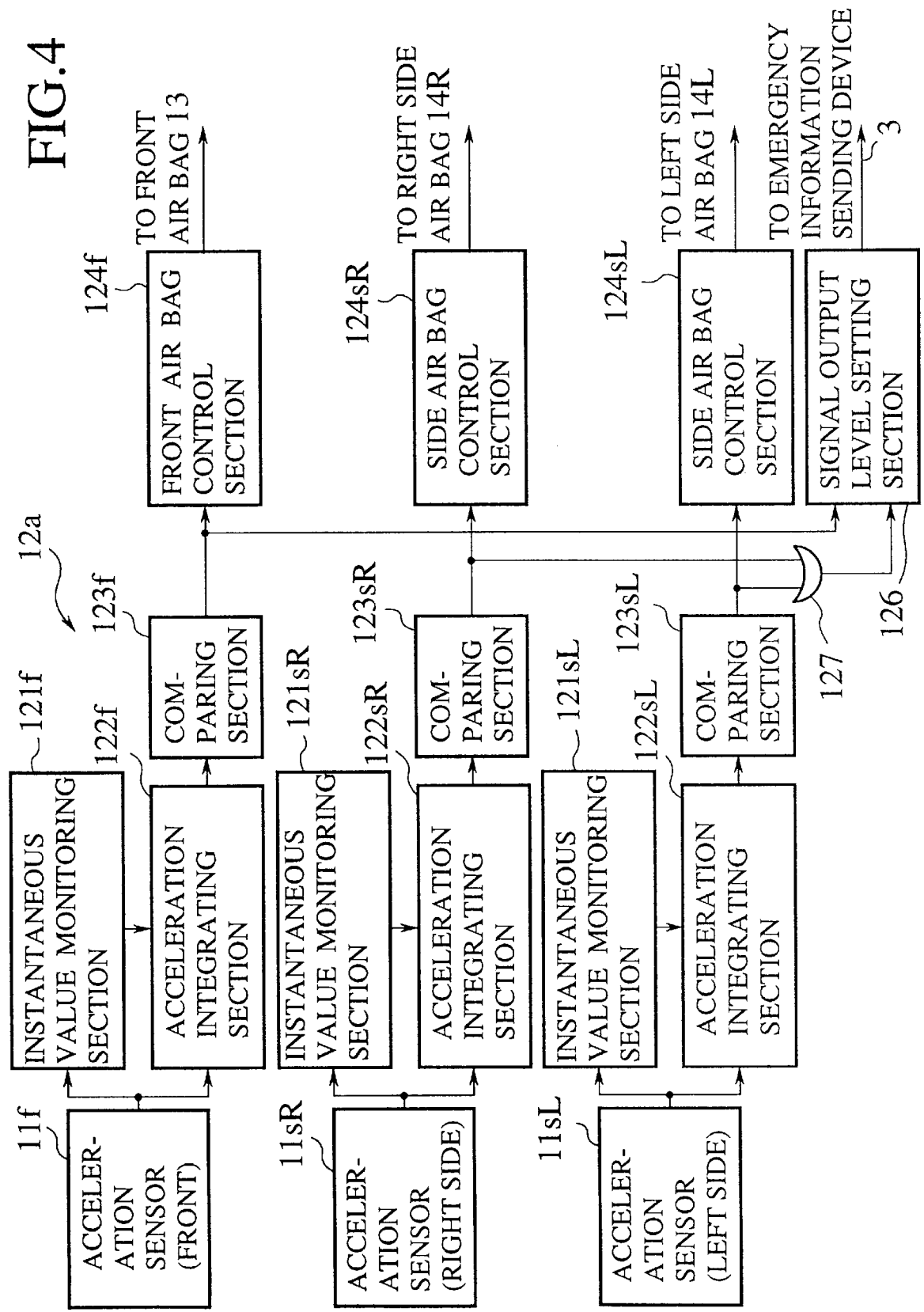

ACCIDENT REPORTING SYSTEM FOR A LAND VEHICLE

BACKGROUND OF THE INVENTION

1. Technical field of the invention

The present invention relates to an accident reporting system for a land vehicle which automatically and urgently reports an emergency to a receiver in order to call a rescue with radio signals when an air bag equipped in a vehicle is unfolded.

2. Earlier Technology

Previously, an accident reporting system for a land vehicle, which automatically sends an emergency information to call the rescue including the information such as a positioning data of the vehicle, an information of the user, or an information of the vehicle to a receiver, an emergency communication center, for instance, when an accident occurs on the vehicle, is well known. This kind of system judges that an emergency such as a collision occurs and automatically sends an emergency information when an air bag is unfolded, by using an operation signal to unfold the air bag as a trigger signal for commence transmitting the emergency information automatically.

However, when an operation signal to unfold the air bag is used as a trigger for automatically sending an emergency report, only occurrence of an accident can accurately be judged, but the scale or the situation of the accident cannot be judged in detail. Consequently, for the emergency center receiving the emergency information, it is desirable to go to the rescue at the site where the accident occurs with rescue preparations capable of complying with any serious situation. However, even when an air bag is unfolded, the accident may be various in scales, i.e., it could be a slight accident or a complexed and serious accident. If the scale and/or the seriousness of the accident can be judged from the emergency communicating information, the rescue preparations can be organized according to them, and such a situation can be avoided that they go to the rescue with a large scale of rescue preparations for a slight accident.

SUMMARY OF THE INVENTION

The present invention is made in view of such technical problems to be solved, and the object is to provide an accident reporting system for a land vehicle, which can automatically judge the gravity of an emergency and can automatically send a report corresponding to with a radio wave to a specific destination such as an emergency center immediately after occurrence of an accident where an air bag has been unfolded.

To achieve the above object, according to an aspect of the present invention, there is provided an accident reporting system for a land vehicle, comprising: a shock sensor detecting a shock exerted on a vehicle body; an air bag control means outputting an instruction to unfold an air bag when the magnitude of the shock detected by the shock sensor exceeds a first predetermined value; an emergency level determining means which judges a first emergency occurs when the instruction to unfold said air bag from the air bag control means is outputted, and judges a second emergency occurs when the degree of the shock detected by the shock sensor after receiving the instruction to unfold said air bag exceeds a second predetermined value; and an emergency sending means which transmits with radio wave a first emergency information when the emergency level determining means judges the first emergency occurs, and transmits a second emergency information when the emergency level determining means judges the second emergency occurs.

According to the present invention, when an emergency such as a crash-accident occurs and a sudden shock is added to a body, an air bag control means checks the degree of the shock detected by a shock sensor, and outputs an instruction to unfold an air bag and unfolds the air bag when the degree exceeds a specified value.

In parallel with unfolding of the air bag, the emergency level determining means judges a first emergency occurs if an instruction to unfold an air bag is outputted, and after that, the emergency level determining means monitors the degree of the shock detected by the shock sensor and judges a second emergency which is more serious than the first emergency occurs when the degree of the shock after the unfolding of an air bag exceeds a specified value. The emergency sending means sends by radio a first emergency information when the emergency level determining means judges a first emergency occurs, and sends a second emergency information when the emergency level determining means judges a second emergency occurs.

Accordingly, the emergency sending means sends a first emergency information in such a simple crash-accident that any large shocks are not added to the vehicle after the unfolding of an air bag, and sends a second emergency information in such a multiple impact accident that large shocks are continuously added to the vehicle after the unfolding of an air bag, so that a specific destination such as an emergency center receiving the emergency information judges the accident is simple when receiving a first emergency information, and judges a serious situation such as a multiple impact accident occurs when receiving a second emergency information, and can organize rescue preparations complying with them.

In a preferred embodiment of the present invention, the first emergency information includes an information indicating a first impact in the accident, and the second emergency information includes an information indicating a second impact in the accident.

In a preferred embodiment of the present invention, the shock sensor includes an acceleration sensor.

In a preferred embodiment of the present invention, when an instantaneous value of acceleration detected by the acceleration sensor exceeds a specified value, the time integration of acceleration starts and the result obtained by the integration of a predetermined time length is taken as the magnitude of the shock.

Furthermore, to achieve the above object, according to another aspect of the present invention, there is provided an accident reporting system for a land vehicle, comprising: shock sensor in the longitudinal direction for detecting shocks in the longitudinal direction exerted on a vehicle body; a front air bag control means for outputting an instruction to unfold a front air bag when the degree of the shock detected by the back and forth direction shock sensor exceeds a first specified value; a transverse direction shock sensor for detecting shocks in the transverse direction of the vehicle exerted on said vehicle body; a side air bag control means for outputting an instruction to unfold a side air bag when the degree of the shock detected by the lateral direction shock sensor exceeds a second specified value; an emergency level determining means which monitors the instruction to unfold a front air bag outputted from the front air bag control means and the instruction to unfold a side air bag outputted from the side air bag control means, and judges a first emergency occurs when either of the instructions is outputted and judges a second emergency occurs when both of the instructions are outputted; and an emergency sending means which sends by radio to a specific destination a first emergency information when the emergency level determining means judges the first emergency occurs, and sends a second emergency information when the emergency level determining means judges the second emergency occurs.

According to the present invention, when an emergency such as a crash-accident occurs and a large shock is added to a body, a front air bag control means and a side air bag control means unfold a front air bag and a side air bag respectively according to the direction of the shock, and at the same time, an emergency level determining means judges a first emergency occurs when an instruction to unfold an air bag is outputted from only either the front air bag control means or the side air bag control means, and judges a second emergency more serious than the first emergency occurs when both the instructions to unfold the front air bag and the side air bag are outputted. The emergency sending means sends by radio a first emergency information when the emergency level determining means judges a first emergency occurs, and sends a second emergency information when the emergency level determining means judges a second emergency occurs.

Consequently, a specific destination such as an emergency center judges the accident is a single impact accident when receiving a first emergency information, and judges a serious situation such as a multiple impact accident occurs when receiving a second emergency information, and can organize rescue preparations complying with them.

The nature, principle and utility of the invention will become more apparent from the following detailed description when read in conjunction with the accompanying drawings.

BRIEF DESCRIPTION OF THE DRAWINGS

In the accompanying drawings:

FIG. 4 is a functional block diagram showing the internal function of an air bag control device in the second embodiment.

DESCRIPTION OF THE PREFERRED EMBODIMENTS

The preferred embodiments of the present invention will now be described below in detail according to the drawings.

Figure 1:
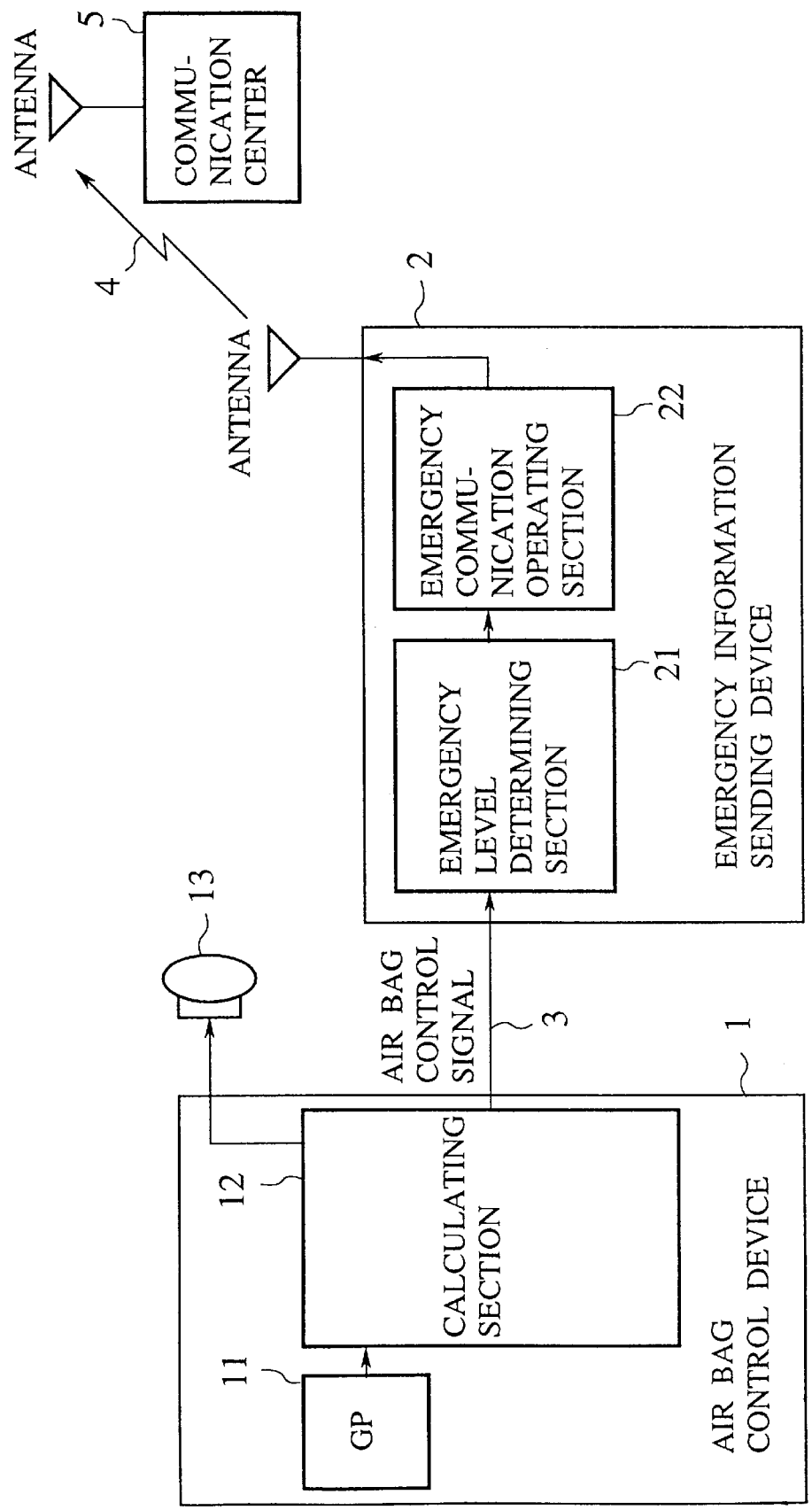
FIG. 1 is a functional block diagram of the first embodiment in an accident reporting system for a land vehicle according to the present invention.

FIG. 1 is a functional block diagram of a first embodiment in an accident reporting system for a land vehicle according to the present invention. This embodiment comprises an air bag control device 1 and an emergency information sending device 2 mounted on a vehicle.

The air bag control device 1 includes: an acceleration sensor (GP) 11 for detecting the shock exerted to a vehicle in the form of acceleration (especially deceleration); an calculating section 12 for performing instantaneous value processing, time integration processing, air bag unfolding judgment processing, and air bag unfolding control processing on the basis of acceleration detection signals from the acceleration sensor 11; and an air bag 13 which is unfolded when receiving an unfolding operation signal from the calculating section 12.

Figure 2:
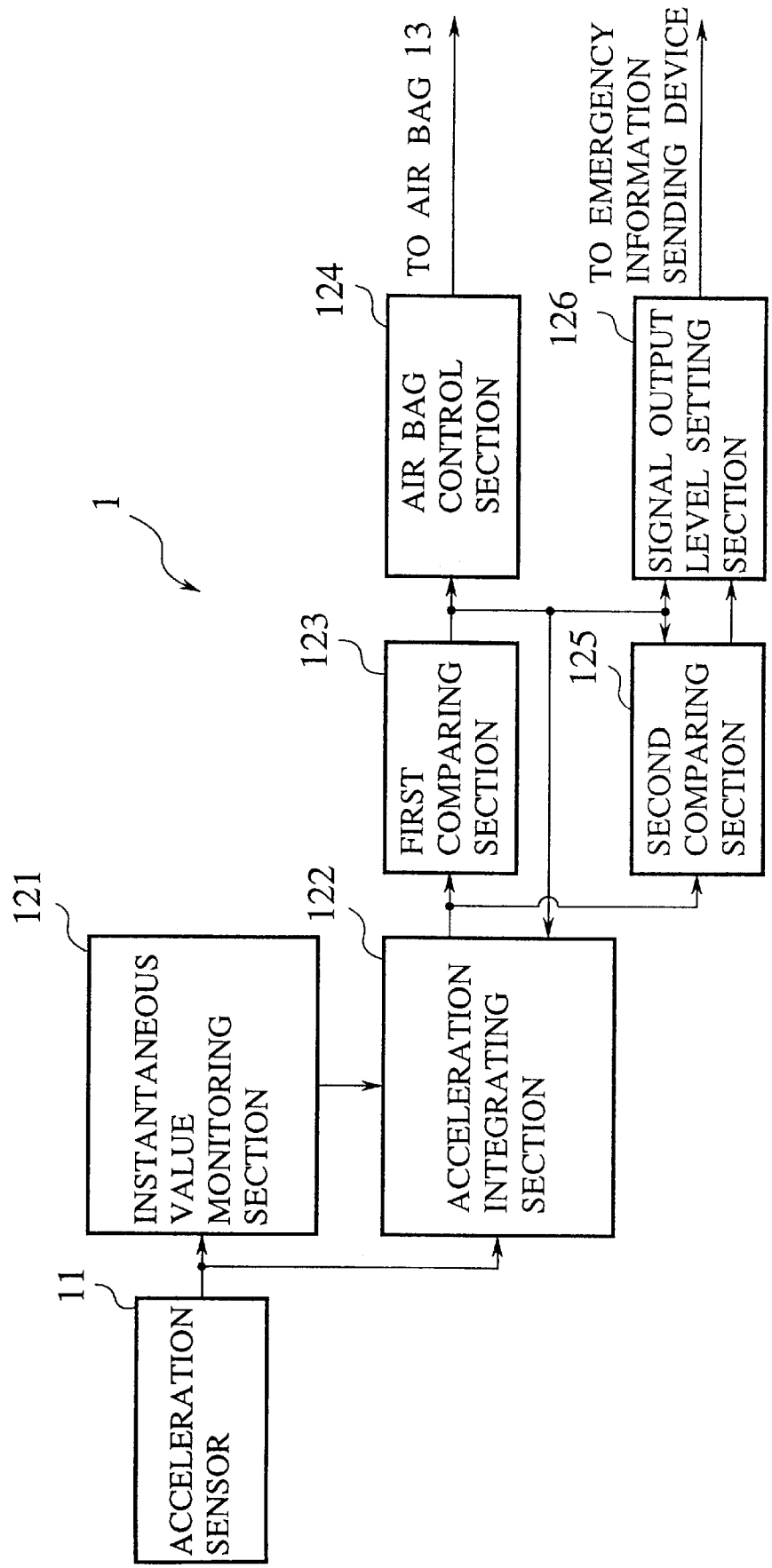
FIG. 2 is a functional block diagram showing the internal function of an air bag control device in the first embodiment.

The functional block diagram of the air bag control device 1 is shown in FIG. 2, and it comprises; an instantaneous value monitoring section 121 which monitors the instantaneous value of an acceleration detection signal from the acceleration sensor 11 and outputs an instruction to start integration when a large acceleration not less than a specified value is detected; an acceleration integrating section 122 which integrates the acceleration detection signal from the acceleration sensor 11 for a predetermined time length when receiving the instruction to start integration from the instantaneous value watching section 121; a first comparing section 123 which compares the time integrated value of acceleration of the predetermined time length acquired by the acceleration integrating section 122 with a specified first reference (being set to a value corresponding to the time integrated value of acceleration which is caused by a shock exerted on the vehicle necessary to unfold the air bag), and outputs an instruction signal to unfold the air bag when it judges the time integrated value of acceleration is larger than a first reference; and an air bag control section 124 which outputs a control signal to the air bag 13 in order to unfold the air bag 13 when the instruction signal to unfold the air bag from the first comparing section 123 is received.

These are components of a normal air bag control device, but the air bag control device 1 has, in addition, such a function that the acceleration integrating section 122 is reset by receiving an instruction signal to unfold an air bag outputted by the first comparing section 123 and performs time integration of acceleration for a preferred time length (for example, for thirty seconds) again. Furthermore, the air bag control device 1 includes in addition to the structures mentions above: a second comparing section 125 which compares the re-integrated value of the acceleration integrating section 122 with a specified second reference (the second reference is determined to a threshold value suitable for discriminating between a single impact accident and a multiple impact accident, and is experimentally determined because it depends on the model of the vehicle, the sensitivity of the sensor etc.), and outputs a signal when the re-integrated value exceeds the second reference; and a signal output level setting section 126 which switches the voltage of the output signal between multiple levels such as 0V, 5V, 10V according to the combination of the signal outputs from the first comparing section 123 and the second comparing section 125, and outputs the output signal as an air bag control signal 3 to the emergency information sending device 2.

The emergency information sending device 2 includes: an emergency level determining section 21 which distinguishes the gravity of the emergency of an accident on the basis of the signal voltage level of the air bag control signal 3 from the air bag control device 1 and determines the emergency level according to that; and an emergency communication operating section 22 which converts the emergency information into a radio signal 4 according to the emergency level indicated from the emergency level determining section 21 and sends it to the emergency communication center 5.

The emergency communication operating section 22 has such a function that it automatically dials a telephone number of a specific destination such as a previously registered emergency center by using a portable or an automotive telephone and automatically sends the emergency information when the line is connected.

The operation of the accident reporting system for a land vehicle with the above structure will now be described. When a crash-accident of some kind occurs and the vehicle stops suddenly, the shock turns into a large deceleration and the acceleration sensor 11 detects the large deceleration.

The acceleration detection signal of the acceleration sensor 11 is monitored by the instantaneous value watching section 121 at all times, and when an instantaneous value of the acceleration detection signal becomes a value larger than a reference acceleration value, the instantaneous value monitoring section 121 judges a collision may have occurred and outputs the judgment signal to the acceleration integrating section 122. The acceleration integrating section 122 integrates the acceleration detection signal outputted by the acceleration sensor 11 for a predetermined time length. The acceleration integrated value of a predetermined time length is given to the first comparing section 123 and is compared with the first reference. If it is a large value exceeding the first reference, the first comparing section 123 judges that a crash-accident which needs unfolding the air bag occurs, and outputs an instruction signal to unfold the air bag 13 to the air bag control section 124. The air bag control section 124 performs an operation control of unfolding of the air bag 13 and unfolds the air bag 13.

The instruction signal to unfold an air bag from the first comparing section 123 is given to the acceleration integrating section 122, to the second comparing section 125, and to the signal output level setting section 126, too.

The acceleration integrating section 122 resets the integrated value to zero when receiving the instruction signal to unfold an air bag, and restarts the time integration of the acceleration detection signal from the acceleration sensor 11 of a time length which is previously set again.

The second comparing section 125 compares the value integrated again by the acceleration integrating section 122 for a predetermined time length after the unfolding of the air bag 13, and if the re-integrated value exceeds the second reference, the second comparing section 125 outputs a signal indicating the re-integrated value is larger than the second reference, to the signal output level setting section 126.

The signal output level setting section 126 outputs a 0V output (no output) in the normal condition where no accident occurs, and when receiving an instruction signal to unfold an air bag from the first comparing section 123, the signal output level setting section 126 waits to see whether a signal is outputted from the second comparing section 125 for the time length of re-integration of the acceleration integrating section 122. If a signal is not outputted from the second comparing section 125 after the time length of re-integration has passed, the signal output level setting section 126 judges that the accident is a single impact accident (an accident in a comparatively small scale, i.e., the impact is exerted once on the vehicle by the collision in a law speed) and outputs a 5V signal as an air bag control signal 3 to the emergency information sending device 2. If the signal is outputted from the second comparing section 125, it judges that the accident is a multiple impact accident (an accident possibly being a serious accident where an impact exerted again after the first impact, such as an accident involving several vehicles or collision at a high speed) and outputs a 10V signal as an air bag control signal 3 to the emergency information sending device 2.

The emergency level determining section 21 of the emergency information sending device 2 checks the signal voltage level of the air bag control signal 3 outputted from the air bag control device 1. If the voltage of the signal is 0V, it judges there is no trouble and outputs no signal, and if the level is 5V, it judges the accident is a single impact accident and outputs the judgment of a single impact accident as an emergency level judgment signal to the emergency communication operating section 22, and if the signal voltage level of an air bag control signal 3 is 10V, it judges the accident is a multiple impact accident and outputs the judgment of a multiple impact accident as an emergency level judgment signal to the emergency communication operating section 22.

When receiving the emergency level judgment signal from the emergency level determining section 21, the emergency communication operating section 22 sends the emergency information such as data of the position of the vehicle, information of the user, information of the vehicle, including the information to discriminate between a single impact accident and a multiple impact accident to the emergency communication center 5 with radio wave.

In the emergency communication center 5 receiving the information, the information to discriminate between a single impact accident and a multiple impact accident contained in the emergency information 4 is analyzed and utilized to determine the scale of the rescue preparations.

Thus, the first embodiment of the accident reporting system for a land vehicle judges whether the accident is a single impact accident or a more serious emergency on the basis of the magnitude of the shock exerted to the vehicle after the unfolding of an air bag, and automatically sends an emergency information to call the rescue, so that the emergency center which receives the emergency information can determine the scale of the rescue preparations on the basis of the emergency information.

Figure 3:
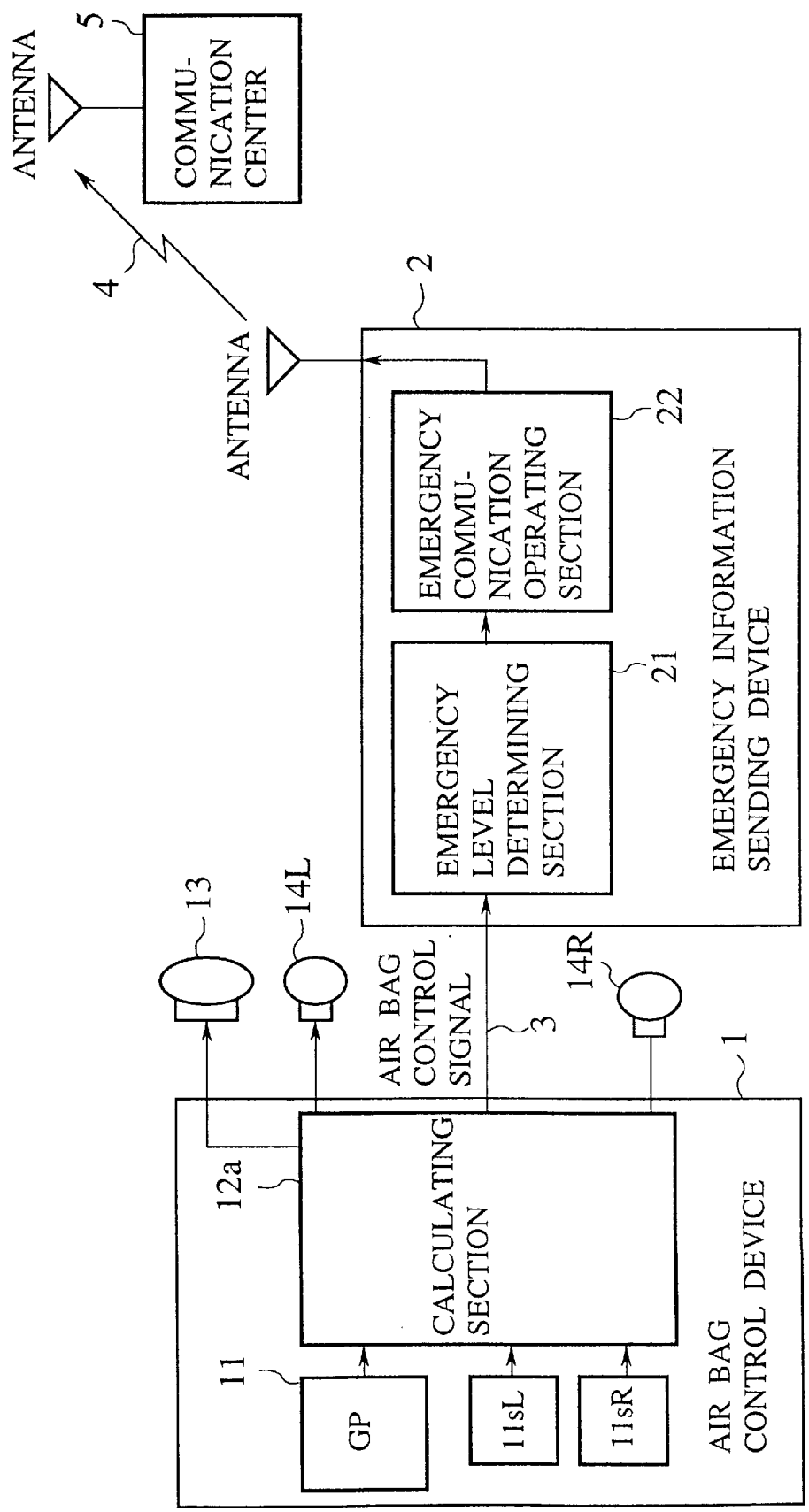
FIG. 3 is a functional block diagram of the second embodiment in an accident reporting system for a land vehicle according to the present invention.

A second embodiment of the present invention will now be described according to FIGS. 3 and 4. The feature of the second embodiment is that the air bag control device 1 controls a front air bag 13, a left side air bag 14L and a right side air bag 14R, and the air bag control device judges the accident is a simple impact accident when it operates to unfold either the front air bag 13 or the side air bags 14L, 14R, and judges the accident is a multiple impact accident when it operates to unfold both the air bags 13, 14L, 14R, and the emergency information sending device 2 sends an emergency information corresponding to the kind of accident to the emergency communication center 5.

The detailed internal structure of the accident reporting system for a land vehicle of the second embodiment will be described according to FIG. 4. The air bag control device 1 comprises: an acceleration sensor 11$f$ for a front air bag; an instantaneous value monitoring section 121$f$ which monitors the instantaneous value of the acceleration detection signal from the acceleration sensor 11$f$ and outputs an instruction to start integration of the instantaneous value when it detects acceleration greater than or equal to a specified value; an acceleration integrating section 122$f$ for integrating the acceleration detection signal from the acceleration sensor 11$f$ for a predetermined time length when receiving an instruction to start integration from the instantaneous value monitoring section 121$f$; a comparing section 123$f$ for a front air bag which compares the acceleration time-integrated value of a predetermined time length acquired by the acceleration integrating section 122$f$ with a specified reference to unfold a front air bag, and outputs an instruction signal to unfold a front air bag when it judges the acceleration time-integrated value is larger than the reference; and a front air bag control section 124$f$ which receives the instruction signal to unfold the air bag 13 from the comparing section 123f and outputs a control signal to unfold the front air bag 13 and it is unfolded.

Furthermore, in parallel with the circuit to control the unfolding of the front air bag 13, as a circuit to control the unfolding of the side air bag 14L, 14R is connected, which comprises: acceleration sensors 11sL, 11sR serving for left and right side air bags 14L, 14R respectively; instantaneous value monitoring sections 121sL, 121sR for monitoring the instantaneous values of the acceleration detection signals of the acceleration sensors 11sL, 11sR respectively; acceleration integrating sections 122sL, 122sR for time-integrating the acceleration detection signals of the acceleration sensors 11sL, 11sR respectively; comparing sections 123sL, 123sR for the left and right side air bags which output instruction signals to unfold side air bags 14L, 14R when the acceleration time-integrated values acquired respectively by the acceleration integrating sections 122sL, 122sR exceed a specified reference to unfold side air bags; and side air bag control sections 124sL, 124sR which receive the instruction signals to unfold the air bags 14L, 14R of the comparing sections 123sL, 123sR respectively and unfold the left and right side air bags 14sL, 12sR respectively.

The air bag control device 1, in addition, comprises: an OR circuit 127 which receives signals from both the comparing sections 123sL, 123sR for left and right side air bags 14L, 14R and outputs signal "H" when receiving an instruction signal to unfold one of the air bags 14sL, 14sR from either of the comparing sections 123sL, 123sR; and a signal output level setting section 126 which switches the voltage of the output signal between several levels, for example 0V, 5V, 10V, similarly to the first embodiment according to the combination of the signal from the comparing section 123f for a front air bag and the signal from the OR circuit 127, and outputs the output signal as an air bag control signal 3 to the emergency information sending device 2.

The emergency information sending device 2 comprises an emergency level determining section 21 and an emergency communication operating section 22, similar to the first embodiment.

The operation of the accident reporting system for a land vehicle of the second embodiment with the above-mentioned structure will now be described. If the front portion of a vehicle collides against something, and the vehicle stops suddenly or a large shock occurs, the acceleration sensor 11f for a front air bag detects the acceleration caused by the shock. Moreover, if either the left or right side surface of the vehicle collides against something and a large shock occurs, either of the acceleration sensors 11sL, 11sR for side air bags 14L, 14R detects the acceleration of the shock.

The instantaneous value monitoring section 121f monitors the acceleration detection signal from the acceleration sensor 11f for the front air bag 13 while the air bag control device 1 is functioning, and if the instantaneous value of acceleration becomes larger than a reference acceleration, the instantaneous value monitoring section 121f judges a crash-accident may occur and outputs the judgment signal to the acceleration integrating section 122f, and the acceleration integrating section 122f integrates the acceleration detection signal outputted by the acceleration sensor 11f for a predetermined time length. The acceleration integrated value of a predetermined time length is sent to the comparing section 123f, and the comparing section 123f compares it with a previously set reference, and if it is large enough to exceed the reference, the comparing section 123f judges that a crash-accident which needs unfolding the front air bag 13 occurs and outputs an instruction signal to unfold an air bag to the front air bag control section 124f, and the front air bag control section 124f unfolds the front air bag 13. Then, the instruction signal to unfold the air bag 13 from the comparing section 123f is, further, given to the signal output level setting section 126.

Similarly, the instantaneous value monitoring sections 121sL, 121sR monitor respectively the acceleration detection signals sent respectively from the acceleration sensors 11sL, 11sR for left and right side air bags 14L, 14R while the air bag control device 1 is functioning, and if the instantaneous values of the acceleration detection signals of the acceleration sensors 11sL, 11sR become larger than a reference acceleration, the instantaneous value monitoring sections 121sL, 121sR judge a crash-accident may occur and output the judgment signals to the corresponding acceleration integrating sections 122sL, 122sR. The acceleration integrating sections 122sL, 122sR integrate the acceleration detection signals outputted by the acceleration sensors 11sL, 11sR for a predetermined time length. The acceleration integrated values of a predetermined time length are given to the comparing sections 123sL, 123sR. The comparing sections 123sL, 123sR compare them with a previously set reference, and if they are exceeding the reference, the comparing sections 123sL, 123sR judge a crash-accident which needs unfolding the side air bags 14L, 14R occurs, and output the instruction signals to unfold the air bag 14L, 14R to the side air bag control sections 124sL, 124sR. The side air bag control sections 124sL, 124sR unfold the corresponding side air bags 14sL, 14sR. Then, the instruction signals to unfold the air bags from the comparing sections 123sL, 123sR are outputted to the OR circuit 127 too. The output signal of the OR circuit 127 is given to the signal output level setting section 126.

When any accident does not occur and the signal output level setting section 126 does not receive any instruction signal to unfold an air bag from the comparing section 123f for a front air bag or the OR circuit 127, the signal output level setting section 126 outputs 0 V (no output), and when it receives an instruction signal to unfold an air bag from either the comparing section 123f for the front air bag 13 or the OR circuit 127, it judges the accident is a single impact accident and outputs a 5V signal. When it receives instruction signals to unfold the air bags from both the comparing section 123f and the OR circuit 127, it judges the accident is a multiple impact accident and outputs a 10V signal.

The emergency level determining section 21 of the emergency information sending device 2 checks the signal voltage level of the air bag control signal 3 outputted from the air bag control device 1, and if the voltage level is 0V, it judges there is no abnormality and outputs no signal, and if the voltage level is 5V, it judges the accident is a single impact accident and outputs a judgment of a single impact accident to the emergency communication operating section 22, and if the signal voltage level of the air bag control signal 3 is 10V, it judges the accident is a multiple impact accident and outputs a judgment of a multiple impact accident to the emergency communication operating section 22. The emergency communication operating section 22 receives the emergency level judgment signal from the emergency level determining section 21 and sends the emergency information 4 such as data of the position of the vehicle, information of the user, information of the vehicle, including the information to discriminate between a single impact accident and a multiple impact accident to the emergency communication center 5 with radio wave.

Thus, the second embodiment of the accident reporting system for a land vehicle judges whether the accident is a single impact accident or a multiple impact accident on the basis of if either the front air bag or the side air bag is unfolded, or both the front air bag and the side air bag are unfolded, and automatically sends an emergency information corresponding to the judgment to call the rescue, so that the receiver of the information such as an emergency center can determine whether the scale of the accident is slight or serious and can prepare the rescue properly according to the emergency information.

It should be understood that many modifications and adaptations of the invention will become apparent to those skilled in the art and it is intended to encompass such obvious modifications and changes in the scope of the claims appended hereto.

What is claimed is:

1. An accident reporting system for a land vehicle for calling a rescue automatically, comprising:

shock sensor for detecting a shock exerted to a vehicle body;

an air bag controller which outputs an instruction to unfold an air bag when the magnitude of the shock detected by said shock sensor exceeds a first predetermined value:

an emergency level determining means which determines that a first emergency occurs when said instruction to unfold said air bag from said air bag control means is outputted, and which determines that a second emergency occurs when the degree of the shock detected by said shock sensor after receiving said instruction to unfold said air bag exceeds a second predetermined value; and an emergency sending means which transmits a first emergency information with radio wave when said emergency level determining means determines that said first emergency occurs, and which transmits a second emergency information when said emergency level determining means determines that said second emergency occurs.

2. An accident reporting system for a land vehicle described in claim 1, wherein said first emergency information includes an information indicating a first impact in the accident and said second emergency information includes an information indicating a second impact in the accident.

3. An accident reporting system for a land vehicle described in claim 1, wherein said shock sensor includes an acceleration sensor.

4. An accident reporting system for a land vehicle described in claim 3, wherein when an instantaneous value of acceleration detected by said acceleration sensor exceeds a specified value, time integration of the acceleration starts, and the result obtained by integrating the acceleration for a predetermined time length is taken as said magnitude of the shock.

5. An accident reporting system for a land vehicle, comprising:

shock sensor in the longitudinal direction for detecting a shock in the back and forth direction of the vehicle exerted on a vehicle body;

front air bag controller which outputs an instruction to unfold a front air bag when the degree of the shock detected by said shock sensor in the back and forth direction exceeds a first specified value;

shock sensor in the transverse direction for detecting a shock in the transverse direction of the vehicle exerted on said vehicle body;

a side air bag controller which outputs an instruction to unfold a side air bag when the degree of the shock detected by said shock sensor in the lateral direction exceeds a second specified value;

an emergency level determining means which monitors said instruction to unfold a front air bag outputted from said front air bag controller and said instruction to unfold a side air bag outputted from said side air bag controller, determines that a first emergency occurs when either of the instructions is outputted, and determines that a second emergency occurs when both of the instructions are outputted; and an emergency sending means which sends a first emergency information to a specific destination by radio when said emergency level determining means determines that said first emergency occurs, and which sends a second emergency information when said emergency level determining means determines that said second emergency occurs.

6. An accident reporting system for a land vehicle described in claim 5, wherein said first emergency information includes an information indicating a single impact accident and said second emergency information includes an information indicating a multiple impact accident.

* * * * *